United States Patent Office 2,992,909
Patented July 18, 1961

2,992,909
ADDITIVES TO IMPROVE THE ELECTRICAL PROPERTIES OF COMBUSTIBLE ORGANIC LIQUIDS
Dilworth T. Rogers, Summit, and John P. McDermott, Springfield, N.J., assignors to Esso Research and Engineering Company, a corporation of Delaware
No Drawing. Filed Dec. 31, 1958, Ser. No. 784,087
10 Claims. (Cl. 52—0.5)

The present invention relates to the use of additives to improve the properties of combustible organic fluids and more particularly relates to aviation turbo-jet fuels, gasolines, kerosines, organic solvents and similar combustible liquids boiling in the range between about 75° F. and about 750° F. which have been improved with respect to their electrical properties by the incorporation therein of small amounts of certain complex additive agents prepared by the reaction of chromium salts of low molecular weight carboxylic acids with alkyl phenol sulfides.

Numerous explosions have occurred in recent years during the transportation and handling of gasolines, turbo-jet fuels, dry cleaning solvents and similar combustible organic liquids boiling in the range between about 75° F. and about 750° F. There is mounting evidence that these explosions have, in many cases, been caused by the generation and accumulation of electrical charges within the liquid until vapors of the liquids in admixture with air are ignited by an electrical discharge. Aviation turbo-jet fuels and certain solvents, carbon disulfide for example, are particularly hazardous in this respect because their vapors form explosive mixtures with air over relatively wide temperature ranges and hence any electrical discharge which occurs is likely to cause an explosion.

Although the exact mechanisms involved in the generation, accumulation and discharge of electrical energy during the handling of combustible liquids are not fully understood, it is known that the electrical conductivity of the liquid plays an important role. Increasing the conductivity of the liquid increases the rate at which charges are naturally dissipated and therefore charges sufficient to cause an explosion are less likely to accumulate. In general, it has been found that liquids having specific conductivities in the range of about $1 \times 10^{-15}$ and about $1 \times 10^{-12}$ mhos per centimeter are particularly hazardous and that the danger in handling such liquids can be materially reduced by increasing their conductivities to values greater than about $1 \times 10^{-12}$ mhos per centimeter.

It has been suggested heretofore that certain compounds be added to liquid hydrocarbons and similar combustible materials in order to increase specific conductivity and thus reduce the danger of an explosion due to the generation, accumulation and discharge of electrical energy. Certain metallic compounds, particularly soaps of polyvalent metals and combinations of such soaps with other materials, have been said to be particularly effective. In practice, however, such additives have been found to be of little value because they are readily extracted by water with which the liquids come into contact and because they adversely affect such properties of the liquids as water tolerance and thermal stability.

The present invention provides a new and improved class of additive agents for use in combustible organic liquids boiling in the range between about 75° F. and about 750° F. which greatly improve the electrical properties of such liquids and do not share the undesirable properties which have characterized additives proposed for this purpose in the past. In accordance with the invention, it has now been found that certain chromium complexes have the property of greatly increasing the conductivity of hydrocarbon oils and similar organic liquids are not extracted by water from such liquids to an extent sufficient to prevent their utilization, and do not adversely affect other properties of the liquids to which they are added. This combination of properties renders such chromium complexes eminently suitable for reducing the hazards normally encountered in handling and transporting such liquids.

The chromium complex additive agents which are employed in accordance with the invention are complexes prepared by the reaction of chromium salts of low molecular weight carboxylic acids containing from about 1 to about 6 carbon atoms per molecule with alkyl phenol sulfides. These reaction products may be prepared by the direct combination of the chromium salts with the alkyl phenol sulfides under conditions more fully described hereinafter.

The low molecular weight carboxylic acids suitable for use in preparing the complexes of the invention include saturated and unsaturated, substituted and unsubstituted aliphatic monocarboxylic acids having from 1 to 6 carbon atoms per molecule. Examples of such acids include formic acid, acetic acid, propionic acid, furoic acid, acrylic acid, lactic acid and the like. Saturated low molecular weight acids containing from 2 to about 4 carbon atoms per molecule are preferred. Acetic acid has been found to be particularly effective. Mixtures of the low molecular weight monocarboxylic acids may be employed if desired.

The alkyl phenol sulfides which are employed in preparing the additive complexes of the invention are well known in the art. These compounds may be represented by the following general formula, wherein R designates an alkyl group containing from about 8 to about 20 carbon atoms and $x$ is a small whole number ranging from about 2 to about 6:

(1) Alkyl phenol monosulfides

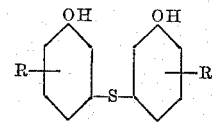

(2) Alkyl phenol disulfides

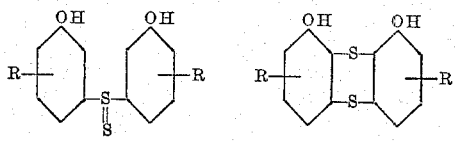

and

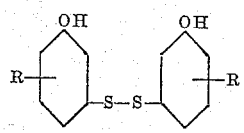

(3) Polymers of alkyl phenol sulfides

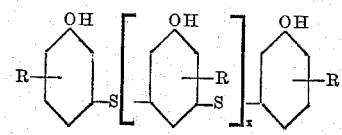

and

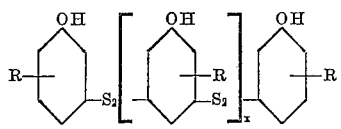

The alkyl phenols used in the preparation of the above sulfides may be prepared by the alkylation of phenols with long chain olefins or with polymers obtained by the polymerization of low molecular weight olefins such as propylene, butylenes, amylenes and mixtures of such olefins. The polymers prepared from low molecular weight olefins consist of mixtures of isomeric compounds and hence the alkyl phenols prepared from such polymers are generally mixed alkyl phenols. The alkyl phenol sulfides may be produced by reacting the alkyl phenols with sulfur dichloride according to the method described in U.S. 2,362,289–93 and by other methods familiar to those skilled in the art. Although the reaction of two mols of an alkylated phenol with one mol of sulfur dichloride will produce primarily alkyl phenol monosulfide, some alkyl phenol disulfides and polymers of alkyl phenol sulfides will also result. The term "alkyl phenol sulfide" as employed herein is therefore intended to cover not only the monosulfides but also the disulfides and polymers of the mono- and disulfides.

As mentioned above, the complexes employed in accordance with the invention can be formed by the direct action of the chromium salt of the low molecular weight acid and the alkyl phenol sulfide at a temperature of from about 200° F. to about 300° F., or by mixing the reactants in a hydrocarbon oil or other solvent, benzene, xylene or alcohol for example, and heating the mixture to a temperature of from about 180° F. to about 280° F. The reactants should be employed in quantities to give a mol ratio of from about 1 to about 25 parts of the alkyl phenol sulfide to each part of the chromium salt. Alkyl phenol sulfide to chromium salt ratios in the range between about 3 to 1 to about 12 to 1 mols per mol are preferred. The complexes thus formed will preferably contain from about 0.5 to about 5.0% chromium by weight. The amount of chromium present will, of course, depend upon the mol ratio in which the reactants are employed.

In a preferred embodiment of the invention, the complex additives prepared in the manner described above are subjected to dialysis or similar treatment in order to remove non-colloidal constituents. It has been found that the colloidal materials in the complexes are surprisingly more active for increasing conductivity than are the non-colloidal constituents. Experience has shown that the undialyzable fraction of the complex, normally from about 1 to about 40% of the total complex, may be as much as 150 times more effective than the dialyzable fraction and as much as 25 times more effective than the total complex. Dialysis techniques suitable for separating the colloidal and non-colloidal constituents of the complexes are well known and will be familiar to those skilled in the art.

The chromium complexes prepared in the manner described above may be added to combustible organic liquids boiling in the range between about 75° F. and about 750° F. in accordance with the invention in concentrations ranging between about 0.00001% and about 0.1% by weight. Concentrations between about 0.0001% and about 0.05% by weight are generally preferred. As has been pointed out heretofore, it has been found that the effectiveness of the additive material depends somewhat on the quantity of colloidal materials in the complex and the exact concentrations employed may therefore depend somewhat upon whether the complex as formed or a complex subjected to dialysis or similar treatment to remove non-colloidal constituents is employed.

The combustible organic liquids in which the additives of the invention may be employed advantageously are those boiling in the range between about 75° F. and about 750° F. and include carbon disulfide, hexane, heptane, diethyl ether, toluene, petroleum naphtha, xylene, gasoline, aviation turbo-jet fuel, kerosine and the like. The additives are particularly useful in gasoline, aviation turbo-jet fuel, kerosine, diesel fuel and similar petroleum distillate fuels. Gasolines which may be benefited by the presence of the additives include both motor gasolines and aviation gasolines such as those defined by ASTM Specifications D–910–56 and D–439–56T. Aviation turbo-jet fuels in which the additives of the invention are particularly useful are described at length in U.S. Military Specification MIL–F–5616, MIL–F–5624D, MIL–F–25558A and MIL–F–25524A. Diesel fuels as referred to in connection with the invention are defined in ASTM Specification D–975–53T.

If desired, the additive agents of the invention may be incorporated into petroleum distillate fuels in the form of an additive concentrate containing the chromium complex materials in combination with other additives conventionally used in such fuels. Such conventional additives include rust inhibitors, dyes, dye stabilizers, antioxidants, and the like. A volatile, inert organic solvent such as benzene, xylene, toluene, diethylene glycol, pyridine or the like may be used as the vehicle in such a concentrate.

The exact nature and objects of the invention may be more fully understood by reference to the following examples.

EXAMPLE 1

Complexes were prepared by reacting chromic acetate and dodecyl phenol sulfide directly or in the presence of solvents at temperatures between about 180° F. and about 300° F. as follows:

A. A solution of 10.0 g. (0.018 mol) of dodecylphenol sulfide and 0.37 g. (0.0015 mol) of chromic acetate in 200 ml. of absolute ethanol was heated on a steam bath until all the alcohol was removed. A clear, dark reddish-green viscous product was obtained which contained 0.78 wt. percent chromium.

B. A mixture of 10.0 g. (0.018 mol) of dodecylphenol sulfide and 0.37 g. (0.0015 mol) of chromic acetate was stirred on a steam bath for 12 hours during which time the mixture gradually became clear. A dark reddish-green viscous product was obtained which contained 0.72 wt. percent chromium.

Other complexes containing from 0.19% to 9.0% chromium were prepared in similar manner by employing the contituents in the reaction mixture in mol ratios ranging from about 0.67 to about 48 parts of dodecyl phenol sulfide per part of the chromic acetate.

EXAMPLE 2

Chromic acetate-dodecyl phenol sulfide complexes and chromic acetate-hexadecyl phenol sulfide complexes prepared by the methods described in the preceding example were added to samples of an aviation turbo-jet fuel and tests were carried out to determine the effectiveness of the additives for increasing the specific conductivity of the fuel. The fuel employed in carrying out these tests was representative of the aviation turbo-jet fuel classified as JP–4 fuel and defined by U.S. Military Specification MIL–F–5624D. It had an API gravity of 48.7°, a Reid vapor pressure of about 2.5 pounds per square inch and a boiling range between about 100° and about 500° F. The complexes employed in the tests contained chromium in amounts ranging from 0.19% to 9% by weight.

The tests were carried out by applying a fixed, direct-current voltage across a standard conductivity cell containing the sample to be tested. A standard high-resistance element was connected in series with the cell and the current which flowed in the circuit during the test was computed by measuring the voltage across the resistance element and applying Ohm's law. The resistance of the sample, the specific resistance and the specific conductivity were in turn computed. The results of these tests are shown below for the base fuel and for the samples of the base fuel containing the various salts.

*Table I*

EFFECT OF ADDITIVES UPON CONDUCTIVITY

| Composition | Mol ratio of phenolic compound to chromic acetate in complex | Chromium in complex, weight percent | Specific conductivity, $\sigma$, mho/cm. | Ratio $\sigma$ (base) to $\sigma$ (base+ add.) |
|---|---|---|---|---|
| Base JP-4 | | | $5.0 \times 10^{-14}$ | |
| Base JP-4+0.002 weight percent chromic acetate-hexadecyl phenol sulfide complex | 1.5/1 | 4.96 | $8.6 \times 10^{-12}$ | 172 |
| Do | 3/1 | 2.50 | $1.5 \times 10^{-11}$ | 300 |
| Do | 6/1 | 1.35 | $2.0 \times 10^{-12}$ | 40 |
| Base JP-4+0.002 weight percent chromic acetate-dodecyl phenol sulfide complex | 2/3 | 9.00 | Insoluble | |
| Do | 3/1 | 3.04 | $5.9 \times 10^{-12}$ | 118 |
| Do | 6/1 | 1.54 | $2.9 \times 10^{-12}$ | 58 |
| Do | 12/1 | 0.78 | $5.9 \times 10^{-12}$ | 118 |
| Do | 24/1 | 0.39 | $1.2 \times 10^{-12}$ | 24 |
| Do | 48/1 | 0.19 | $2.0 \times 10^{-12}$ | 4 |
| Base JP-4+0.002 weight percent chromic acetate-dodecyl phenol complex | 6/1 | 3.20 | $2.0 \times 10^{-13}$ | 4 |
| Base JP-4+0.002 weight percent chromic chloride-dodecyl phenol sulfide complex | 12/1 | 0.78 | $1.0 \times 10^{-14}$ | 0.2 |
| Base JP-4+0.002 weight percent hexadecyl phenol sulfide | | | $9.0 \times 10^{-14}$ | 1.8 |

The data in the above table demonstrate the significant increase in the specific conductivity of combustible organic liquids which occurs as a result of the addition thereto of the chromium complexes of the invention. The data also show that complexes prepared with an alkyl phenol sulfide and a chromium salt of a carboxylic acid in a ratio between about 1 and about 25 mols of the alkyl phenol sulfide per mol of the chromium salt are much more effective than those prepared by employing the reactants in ratios outside that range. The complex prepared with 2 mols of dodecyl phenol sulfide and 3 mols of chromium acetate, for example, was insoluble in aviation turbo-jet fuel and hence would normally be unsatisfactory for use as an additive in such fuel. Complexes prepared by using the reactants in ratios greater than about 25/1 showed much lower increases in conductivity than those prepared from the reactants in the 1/1 to 25/1 mol ratios. It will further be noted that complexes prepared with alkyl phenols in place of the alkyl phenol sulfides and those prepared with chromic chloride in place of the chromic salts of carboxylic acids were relatively ineffective. Similarly, the addition to the fuel of hexadecyl phenol sulfide alone had little effect upon specific conductivity. The data in the table thus demonstrate that the additive complexes of the invention greatly increase the specific conductivity of combustible organic liquids and that closely related materials do not possess this property. Liquids containing the additives of the invention are much less likely, by virtue of their increased conductivity, to accumulate electrical charges to the point where a discharge occurs than are similar liquids not containing the additive and hence present less of an explosive hazard.

EXAMPLE 3

To demonstrate the effect of the concentration of the additive complexes of the invention upon the specific conductivity of combustible organic liquids, further tests were carried out wherein a chromic acetate-dodecyl phenol sulfide complex containing dodecyl phenol sulfide and chromic acetate in a mol ratio of 12/1 were added to samples of a JP-4 aviation turbo-jet fuel similar to that employed in the preceding example in concentrations ranging from 0.001 wt. percent to 0.005 wt. percent. The specific conductivity of the base fuel and that of the samples containing the additives in various concentrations were then measured. The results obtained are shown in Table II.

*Table II*

EFFECT OF ADDITIVE CONCENTRATION UPON CONDUCTIVITY OF JP-4

| Concentration of chromic acetate-dodecyl phenol sulfide in JP-4 fuel | Specific conductivity, $\sigma$, mho/cm. | Ratio, $\sigma$ (base) to $\sigma$ (base + additive) |
|---|---|---|
| None | $5.0 \times 10^{-14}$ | |
| 0.001 weight percent | $1.4 \times 10^{-12}$ | 28 |
| 0.002 weight percent | $5.9 \times 10^{-12}$ | 118 |
| 0.005 weight percent | $1.2 \times 10^{-11}$ | 240 |

As shown in Table III, as little as 0.001 wt. percent of the chromic acetate-dodecyl phenol sulfide complex markedly increased the specific conductivity of the base fuel from a level of $5.0 \times 10^{-14}$ mhos per centimeter to $1.4 \times 10^{-12}$ mhos per centimeter. The specific conductivity of the base fuel employed in this test was considerably lower than that of many turbo-jet fuels and other combustible organic liquids in which the additive complexes of the invention will be employed. In such liquids have higher initial specific conductivities, the additive complexes may be employed in concentrations below the 0.001 wt. percent concentration employed in the tests reported in Table II.

EXAMPLE 4

A difficulty encountered with many materials suggested in the past for use as additives to increase the specific conductivity of combustible organic liquids is that such materials are highly soluble in water and hence are readily extracted from the liquids when they come in contact with water in fuel tanks or pipelines. This difficulty is particularly pronounced in the case of calcium sulfonate and many other soaps of polyvalent metals. The additive complexes of the invention, on the other hand, have low water solubility and are not extracted from jet fuels and similar liquids to an extent sufficient to seriously reduce their effectiveness. This is demonstrated by the results of tests wherein a sample of aviation turbo-jet fuel and a sample of the same fuel containing 0.001 wt. percent of a chromic acetate-dodecyl phenol sulfide complex were subjected to specific conductivity determinations before and after water extraction. The extraction involved the agitation of 80 cc. of the fuel with 20 cc. of water for 2 minutes, after which the sample was allowed to stand overnight. The fuel layer was then tested to determine the extent to which its specific conductivity had decreased. Since the specific conductivity of fuels containing the complexes varies directly with the concentration in which the complex is present, any decrease in conductivity would indicate extraction of the complex. The results of these tests are shown in Table III.

*Table III*

EFFECT OF WATER EXTRACTION UPON ADDITIVE

| Composition | Specific conductivity, mho/cm. | |
|---|---|---|
| | Before water washing | After water washing |
| Base JP-4 | $1.9 \times 10^{-13}$ | $2.1 \times 10^{-13}$ |
| Base JP-4+0.001 weight percent chromic acetate-dodecyl phenol sulfide complex | $4.7 \times 10^{-12}$ | $2.4 \times 10^{-12}$ |

Although the data in Table III indicate that a small amount of the chromic acetate-dodecyl phenol sulfide complex was removed from the fuel by the water in the water extraction step, the amount so removed was quite small and was insufficient to seriously reduce the specific conductivity of the fuel. It is thus apparent that there is little danger that the additives of the invention will be lost as a result of water extraction of liquids to which they are added. This low water extractability constitutes an important advantage for the additives over prior art material.

EXAMPLE 5

Water is frequently encountered in bulk handling of aviation turbo-jet fuels, kerosenes and similar combustible liquids. The effect of additives employed in such liquids upon their water tolerance properties is, therefore, of primary importance. It has been found that many of the additives suggested as useful for increasing the conductivity of combustible organic liquids in the past are highly surface-active materials which have an extremely adverse effect upon water tolerance. The increased conductivity brought about through the use of such additives may largely be offset as a result of this tendency to promote the suspension of dispersed water.

Water tolerance tests were carried out in accordance with the method described in Federal Test Standard No. 791, Method 3251.6, "Interaction of Water in Aircraft Fuel," in order to determine the effect of the additive complexes of the invention upon the water tolerance of combustible organic liquids to which they are added. The test employed involves the agitation of 80 cc. of the fuel to be tested with 20 cc. of water for a 2 minute period, followed by a 5 minute settling period. At the end of this settling period, the condition of the water-fuel interface is noted. A rating is assigned to the fuel in accordance with the following criteria:

INTERACTION OF WATER AND AIRCRAFT FUELS (Method 3251.6, Fed. Test Std. No. 791)

Appearance of interface: Interface rating
Clear and clean _____ 1
A few small clear bubbles covering not more than 50% of the interface _____ 1B
Shred of lace and/or film at interface _____ 2
Loose lace and/or slight scum _____ 3
Tight lace and/or heavy scum _____ 4

The results of these tests and tests of other materials proposed heretofore for increasing the specific conductivity of jet fuels are shown below.

Table IV

WATER TOLERANCE OF COMPLEX ADDITIVES

Composition: Interface rating
Base JP-4 _____ 1
Base JP-4+0.001 wt. percent chromic acetate-dodecyl phenol sulfide complex _____ 1
Base JP-4+0.01 wt. percent of calcium petroleum sulfonate _____ 4
Base JP-4+0.05 wt. percent of sodium dioctyl sulfo-succinate _____ 4
Base JP-4+0.01 wt. percent of lecithin _____ 4

The addition of 0.001 wt. percent of a chromic acetate-dodecyl phenol sulfide complex to the base fuel employed in the test reported in Table V had not effect upon the interface rating, whereas the prior art materials rendered the fuel unacceptable from the standpoint of water tolerance. It is therefore evident that this additive meets the critical water tolerance requirements for turbo-jet aviation fuels and represents an improvement over materials of the prior art.

EXAMPLE 6

As has been pointed out heretofore, it has been found that the activity of the additive complexes of the invention is primarily due to the colloidal constituents therein. This is demonstrated by a series of experiments in which complexes prepared in the manner described in Example 1 were dialyzed in order to separate the colloidal and non-colloidal components of the complexes. The dialysis separations were carried out using a semi-permeable rubber membrane-isooctane system. Two separate dodecyl phenol sulfide-chromic acetate complexes were prepared using different ratios of phenol sulfide and chromic acetate. These complexes were tested to determine their effect on the specific conductivity of aviation turbo-jet fuel. The colloidal and non-colloidal fractions of these same complexes obtained as a result of the dialysis were similarly tested. The results of the tests are shown in Table V.

Table V

EFFECT OF COLLOIDAL ADDITIVE COMPLEX UPON SPECIFIC CONDUCTIVITY

| Composition | Specific conductivity, $\sigma$ mho/cm. | Ratio $\sigma$ (base) to $\sigma$ (base+additive) |
|---|---|---|
| Base JP-4 | $4.0 \times 10^{-14}$ | |
| Base JP-4+0.002 weight percent chromic acetate-dodecyl phenol sulfide complex A | $5.9 \times 10^{-12}$ | 118 |
| Base JP-4+0.002 weight percent non-colloidal fraction (92 weight percent) of chromic acetate-dodecyl phenol sulfide complex A | $1.1 \times 10^{-12}$ | 28 |
| Base JP-4+0.002 weight percent colloidal fraction (8 weight percent) of chromic acetate-dodecyl phenol sulfide complex A | $1.4 \times 10^{-10}$ | 3,500 |
| Base JP-4+0.002 weight percent chromic acetate-dodecyl phenol sulfide complex B | $5.9 \times 10^{-12}$ | 118 |
| Base JP-4+0.002 weight percent non-colloidal fraction (74 weight percent) of chromic acetate-dodecyl phenol sulfide complex B | $2.0 \times 10^{-13}$ | 5 |
| Base JP-4+0.002 weight percent colloidal fraction (26 weight percent) of chromic acetate-dodecyl phenol sulfide complex B | $8.9 \times 10^{-11}$ | 2,235 |

From Table V it can be seen that the colloidal fractions of the dodecyl phenol sulfide-chromic acetate complexes were from about 18 to about 30 times as effective for increasing specific conductivity as were the total complexes and from about 125 to about 450 times as effective as were the non-colloidal fractions of the complexes. The reason for this surprising superiority of the colloidal material separated from the complexes is not fully understood. It has been found that the colloidal components are not simple compounds and cannot be synthesized by simply reacting the alkyl phenol sulfide and the chromic salt in a ratio which would give an empirical formula identical to that obtained by elemental analysis. Attempts to synthesize such materials resulted in the formation of a solid which was insoluble in turbo-jet fuels and in a variety of organic solvents. Regardless of the identity of the colloidal constituents of the complexes, however, the advantages in employing such constituents as additives for increasing the electrical conductivity of combustible organic liquids are obvious.

EXAMPLE 7

In order to further demonstrate the effect of the colloidal additive agents which constitute one embodiment of the invention, further tests were carried out wherein colloidal materials obtained by the dialysis of a complex of dodecyl phenol sulfide and chromic acetate containing 0.78 wt. percent chromium were incorporated into samples of a base turbo-jet fuel and specific conductivity determinations were made on each sample. It was found that the use of from 0.0001 wt. percent to 0.01 wt. percent of the colloidal additive agents increased the specific conductivity of the fuel from 80 to 9000 times.

Table VI
EFFECT OF ADDITIVE CONCENTRATION UPON CONDUCTIVITY OF JP-4

| Concentration of colloidal chromic acetate-dodecyl phenol sulfide in JP-4 fuel | Specific conductivity, $\sigma$, mho/cm. | Ratio $\sigma$ (base) to $\sigma$ (base+additive) |
|---|---|---|
| None | $4.0 \times 10^{-14}$ | |
| 0.0001 weight percent | $5.0 \times 10^{-12}$ | 80 |
| 0.0005 weight percent | $2.1 \times 10^{-11}$ | 530 |
| 0.001 weight percent | $4.0 \times 10^{-11}$ | 1,000 |
| 0.0025 weight percent | $1.0 \times 10^{-10}$ | 2,500 |
| 0.005 weight percent | $2.0 \times 10^{-10}$ | 5,000 |
| 0.01 weight percent | $3.6 \times 10^{-10}$ | 9,000 |

Although the colloidal constituents prepared in the manner disclosed hereinbefore are extremely potent additives for increasing the electrical properties of combustible organic liquids boiling in the range between about 75° F. and about 750° F., it will be recognized that the invention is not limited or restricted to the use of these materials. The total alkyl phenol sulfide-chromic acetate complexes of the invention are extremely effective additives in their own right and are markedly superior to additives employed heretofore. Because of the expense in separating the colloidal and non-colloidal complexes of such additives it will, in most cases, be preferred to employ the total complexes rather than merely the colloidal constituents of the complexes. The colloidal materials will, however, be particularly effective for use in applications where extremely small additive concentrations must be employed, as in the case of certain fuels designed for use in engines in which it is desired to maintain the ash content at an absolute minimum.

Although the additives of the invention have been described above as complexes of chromium salts of low molecular weight acids with alkyl phenol sulfides, similar complexes can be prepared by using other cyclic phenolic materials and other metal salts of low molecular weight acids. Complexes prepared with cobalt, nickel and aluminum salts of acetic and similar acids, for example, are attractive for use in turbo-jet fuels in order to improve their electrical properties.

What is claimed is:

1. A combustible organic liquid boiling in the range between about 75° F. and about 750° F. to which has been added from about 0.00001% to about 0.1% by weight of a complex of a chromium salt of a saturated aliphatic monocarboxylic acid containing from 1 to 6 carbon atoms per molecule and an alkyl phenol sulfide having alkyl groups of from about 8 to about 20 carbon atoms in length, the mol ratio of said alkyl phenol sulfide and said chromium salt in said complex ranging from about 1 to 1 to about 25 to 1, said complex being characterized by the reaction of said chromium salt and said alkyl phenol sulfide at temperatures of from about 180° F. to about 300° F.

2. A composition as defined by claim 1 wherein said complex is present in a concentration of from about 0.0001% to about 0.05% by weight.

3. A composition as defined by claim 1 wherein said chromium salt is chromium acetate.

4. A composition as defined by claim 1 wherein said alkyl phenol sulfide and said chromium salt are complexed in a mol ratio between about 3/1 and about 12/1.

5. A composition as defined by claim 1 wherein said complex contains from about 0.2 to about 5.0% chromium by weight.

6. A composition as defined by claim 1 wherein said complex consists essentially of colloidal particles.

7. A petroleum distillate fuel boiling in the range between about 75° F. and about 750° F. to which has been added from about 0.0001% to about 0.05% by weight of a complex of a chromium salt of a saturated aliphatic monocarboxylic acid containing from 1 to 6 carbon atoms per molecule and an alkyl phenol sulfide having alkyl groups of from about 8 to 20 carbon atoms in length, the mol ratio of said alkyl phenol sulfide and said chromium salt in said complex ranging from about 1 to 1 to about 25 to 1, said complex being characterized by the reaction of said chromium salt and said alkyl phenol sulfide at temperatures of from about 180° F. to about 300° F.

8. A fuel as defined by claim 7 wherein said chromium salt is chromic acetate and said sulfide is dodecyl phenol sulfide.

9. A fuel as defined by claim 7 wherein said chromium salt is chromic acetate and said sulfide is hexadecyl phenol sulfide.

10. A fuel as defined by claim 7 wherein said complex consists essentially of colloidal particles.

References Cited in the file of this patent
UNITED STATES PATENTS

| | | |
|---|---|---|
| 2,362,289 | Mikeska | Nov. 7, 1944 |
| 2,362,293 | McNab et al. | Nov. 7, 1944 |
| 2,573,294 | Ackerman et al. | Oct. 30, 1951 |
| 2,639,227 | Glendenning et al. | May 19, 1953 |

FOREIGN PATENTS

| | | |
|---|---|---|
| 749,898 | Great Britain | June 6, 1956 |
| 493,858 | Canada | June 23, 1953 |